UNITED STATES PATENT OFFICE.

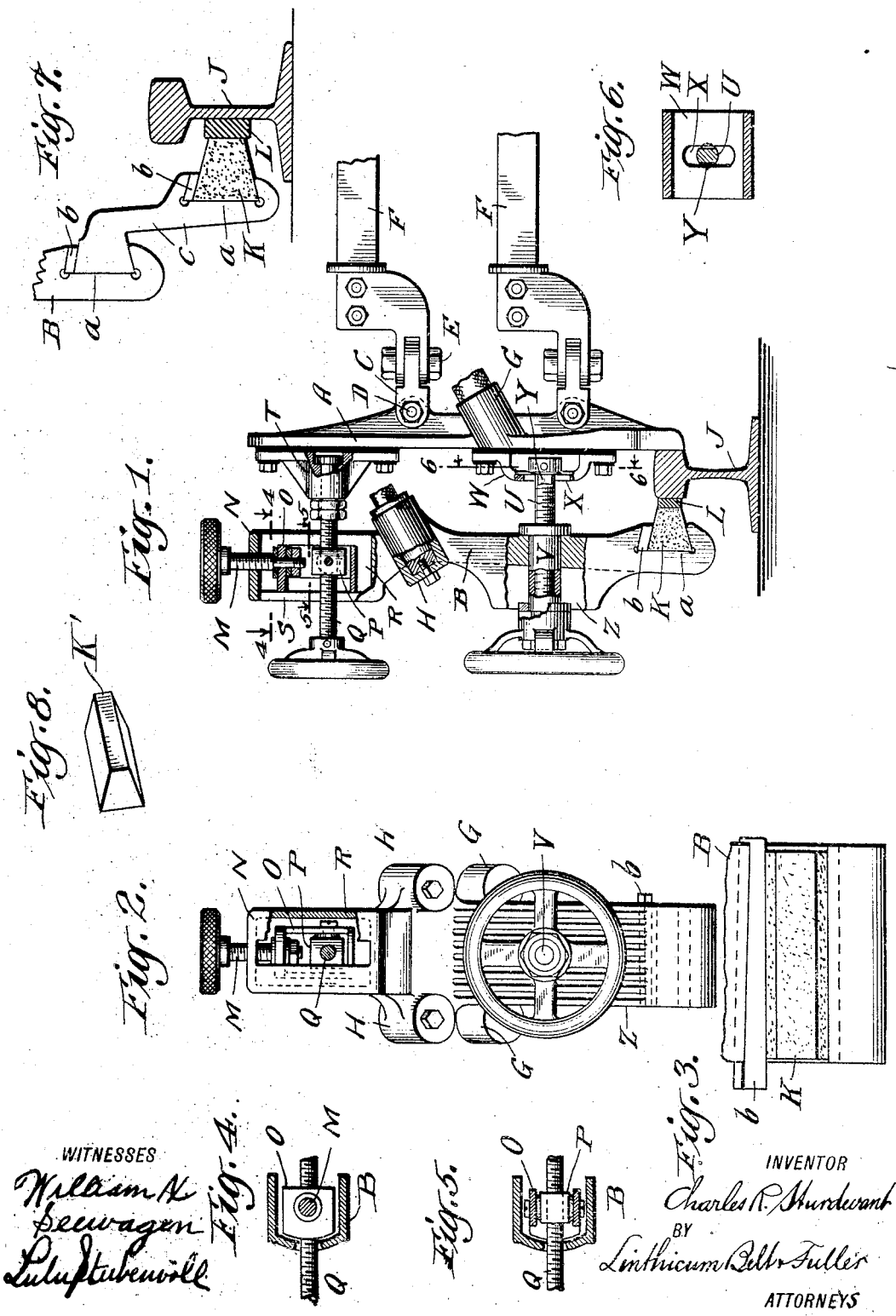

CHARLES R. STURDEVANT, OF WORCESTER, MASSACHUSETTS, ASSIGNOR TO THE AMERICAN STEEL & WIRE COMPANY, OF HOBOKEN, NEW JERSEY, A CORPORATION OF NEW JERSEY.

CLAMP FOR BRAZING OR SIMILAR WORK.

1,002,941.  Specification of Letters Patent.  Patented Sept. 12, 1911.

Application filed July 9, 1910. Serial No. 571,169.

*To all whom it may concern:*

Be it known that I, CHARLES R. STURDEVANT, a citizen of the United States, residing at Worcester, Massachusetts, have invented new and useful Improvements in Clamps for Brazing or Similar Work, of which the following is a specification.

This invention aims to provide an improved brazing clamp or electrode carrier adapted for various uses and especially for brazing rail bonds to railroad rails.

The apparatus is simple, easily manipulated and capable of various adjustments to adapt it for the best work.

The accompanying drawings illustrate an embodiment of the invention.

Figure 1 is a side elevation, partly in section, showing the apparatus applied to the brazing of a terminal of a bond upon the side face of the head of a rail. Fig. 2 is an end elevation, partly in section. Fig. 3 is an inside face elevation of the lower part of the member carrying the electrode. Figs. 4, 5 and 6 are respectively sectional views of details on the lines 4, 5 and 6 of Fig. 1. Fig. 7 is a side elevation of a means for extending the electrode holding member. Fig. 8 is a perspective view of the preferred form of electrode.

Referring to the embodiment of the invention illustrated the apparatus comprises a pair of cast copper members A and B adapted to clamp upon the work. The member A is supported by two universal joints consisting of links C connected by pivots D and E at right angles to each other with arms F constituting parts of a support which may be carried by a car and which forms the subject matter of a separate pending application for patent. The member A is provided with sockets G and the member B with sockets H whereby each of the members is connected by two branches with one of the opposite terminals of a transformer or other source of current, the two members being insulated from each other as hereinafter described. The member A bears against the inner face of the head of the rail J and the member B carries a carbon electrode K bearing against a terminal L of the bond and holding the latter against the outer face of the rail head. A flux and brazing alloy is introduced between the terminal L of the bond and the head of the rail. The current being then turned on passes through the bond terminal and the rail and brazes the terminal to the head of the rail.

The two members A and B of the clamp are movable, one relatively to the other, either upward and downward, or transversely toward or away from each other. Also they may be adjusted angularly one relatively to the other. Means are provided for effecting these various adjustments readily and easily.

The relative vertical adjustment is effected by means of the adjusting screw M threaded through the head N of the member B and swiveled at its lower end in a slide O which carries a block P swiveled on a horizontal pivot and through which is threaded a horizontal adjusting screw Q fastened to the member A. The screw Q, block P and slide O are, as far as vertical movement is concerned, substantially fixed parts of the member A, and the vertical adjusting screw M is attached thereto so that the turning of it causes the shifting of the member B upward or downward. The screw Q is also an adjusting screw, for a transverse adjustment for the members toward or away from each other at their upper ends. The forcible pressure upon the upper end of the member B needs to be in the outward direction only so as to press the electrode at the lower end forcibly against the bond terminal; the inward movement of the upper end being unresisted so that it may be effected through the engagement of the screw M with the head N, the screw being connected at its lower end to the transversely adjustable slide O. The upper end of the member B is provided with a socket R, the outer face of which is formed with a slot S through which the adjusting screw Q passes freely and the inner face of which is entirely open to permit the introduction of the slide O. The slide is adapted to have a vertical adjustment in the socket to secure the desired vertical adjustment, and when the adjusting screw Q is properly turned bears against the outer wall of the socket so as to press the outer end of the member B outward and its lower end inward. The adjusting screw Q has a swivel connection with the collar T which is fastened rigidly upon the member A but insulated therefrom in any usual or suitable way.

The lower adjusting screw U is threaded through a nut V which is keyed in the lower part of the member B, the inner end of the screw being held by a strap W fastened upon and insulated from the member A and having a vertical slot X through which the end of the screw passes, the screw having a head on its inner end of greater diameter than the width of the slot and having flat faces Y which prevent it from turning in the slot, while permitting vertical movement. This lower adjusting screw U will ordinarily be used as a clamping screw. The adjustments, vertical and transverse, at the upper end being set beforehand for operation upon an intended length of railway track.

All the connections are comparatively loose so as to avoid friction and to allow the member B to turn easily through a limited angle about its vertical axis, as well as to permit the angular adjustments in a vertical plane.

The electrode K is of carbon and becomes quite hot during the operation and some heat will be conducted back into the supporting metal. Means are provided for disposing of this heat or a great part of it to prevent its communication back to the connecting cables in the sockets H. For this purpose numerous comparatively thin webs or plates Z are provided on the outer face of the part of the member B between the electrode and the cable-sockets, which webs act as radiators to carry away the heat from the metal. The webs may be provided with holes or otherwise designed to increase the ventilation or exposure to the air.

A very simple and efficient means is provided for attaching the carbon electrode to its supporting member. The lower end of the supporting member B is provided with an under cut socket $a$ extending laterally across its inner face and slightly larger than the flared outer face of the electrode K and shaped to permit the introduction of a thin wedge $b$ between the top or bottom of the electrode and the corresponding wall of the socket $a$. The wedge is of highly conducting metal such as brass and once driven in place holds the carbon firmly, being adapted, however, by a simple blow of a hammer to be withdrawn for the replacement of a burned out carbon. It is important to have simple inexpensive means for connecting the carbon to its support because the carbon oxidizes and wears away quite rapidly and has to be replaced frequently. The wedge can be driven in with any degree of tightness so as not only to secure a firm hold, but also to provide a very efficient electrical contact between the carbon and its support. The design of this connection secures a high contacting efficiency also from the fact that the current can pass into the carbon on three sides insuring a minimum loss of electrical energy and a minimum waste of carbon by exposed surfaces which oxidize at the high temperature used.

Where it is desired to braze the bond terminal to the web of the rail, or for any other reason to extend the electrode carrying member, this may be done by means of the extension piece $c$, Fig. 7, having an upper end shaped like the electrode to fit into the socket $a$ of the member B and to be fastened therein by means of a wedge $b$ and having its lower end provided with a socket $a$ for the carbon K and wedge $b$.

The electrode K may be of the ordinary carbon type unprotected on its faces. Preferably, however, the oxidizing of the carbon is greatly retarded by applying to all the faces or to the more exposed end and top and bottom faces a coating of copper. This may be a quite thin and inexpensive coating electrolitically deposited. It not only gives greater durability to the carbon, but also makes a better contact face than would be provided by the uncoated carbon.

Fig. 8 shows an electrode with smooth metal-coated faces. This manner of protecting the faces has the advantage of automatically wearing away as the face of the carbon is burned away and recedes toward the back of the holder.

Though I have described with great particularity of detail a certain specific embodiment of my invention, yet it is not to be understood therefrom that the invention is restricted to this specific embodiment illustrated and described.

Various modifications may be made in detail, and in the arrangement and combination of the parts by those skilled in the art without departing from the invention.

What I claim is:—

1. An apparatus of the class described, including in combination a pair of members adapted to clamp upon the work, and a longitudinally adjusting screw rotatably attached to a part of one of said members and having a threaded engagement with a part of the other for shifting one of said members longitudinally relatively to the other.

2. An apparatus of the class described, including in combination a pair of members adapted to clamp upon the work, and a longitudinally adjusting screw rotatably attached to a part of one of said members and threaded through a part of the other for shifting one of said members longitudinally relatively to the other, and means for effecting transverse adjustment between said members.

3. An apparatus of the class described, including in combination a pair of members adapted to clamp upon the work, and means for independently adjusting the respective ends of one of said members toward and away from the corresponding ends of the other so as to adjust both their angular relation and their separation from each other, said adjusting means comprising at each end a single screw rotatably attached to a part of one of said members and having a threaded engagement with a part of the other.

4. An apparatus of the class described, including in combination a pair of members A and B, a slide O, one of said parts B and O being movable relatively to the other in a longitudinal direction, and one of said parts A and O being movable relatively to the other in a transverse direction, and screws directly connecting such members A and B respectively to the slide O for effecting such longitudinal and transverse movements.

5. An apparatus of the class described, including in combination a pair of clamping members, a pair of adjusting screws connecting the upper and the lower ends respectively of said members together and permitting adjustment of both the angle and the separation between said members and a vertically adjusting screw for adjusting one of said members vertically relatively to the other, each of said adjusting screws being rotatably attached to one of said members and having a threaded engagement with a part of the other.

6. A brazing apparatus of the class described, including an electrode of carbon with a coating of metal applied to the surface of the carbon.

7. A brazing apparatus of the class described, including an electrode of carbon with an electrolitically applied coating of copper thereon.

8. An apparatus of the class described, including a holder for a brazing carbon having a recess in its face, a carbon having a rear portion fitting in said recess, and a wedge between said rear portion of the carbon and a wall of the recess for holding the carbon firmly in place and with good contact.

9. An apparatus of the class described, including a holder for a brazing carbon having a socket adapted to surround the back and two of the side faces of the carbon in combination with a wedge of conducting metal between one of said side faces and an adjacent wall of the socket, so as to hold the carbon firmly in place and with a good contact and to permit its ready removal.

10. An apparatus of the class described, including a holder for a brazing carbon having a recess in its face adapted to receive a carbon and a separate extension adapted to fit and be fastened in said recess and having a similar recess for receiving a carbon.

In witness whereof, I have hereunto signed my name in the presence of two subscribing witnesses.

CHARLES R. STURDEVANT.

Witnesses:
 KENNETH B. HALSTEAD,
 D. ANTHONY URSINA.

---

Copies of this patent may be obtained for five cents each, by addressing the "Commissioner of Patents, Washington, D. C."